United States Patent
Jose et al.

(10) Patent No.: US 9,939,521 B2
(45) Date of Patent: Apr. 10, 2018

(54) TECHNIQUES FOR USE IN WIDEBAND TIME-OF-ARRIVAL ESTIMATION

(71) Applicant: QUALCOMM Incorporated, San Diego, CA (US)

(72) Inventors: Jubin Jose, Bound Brook, NJ (US); Xinzhou Wu, Hillsborough, NJ (US); Thomas Joseph Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/593,864

(22) Filed: Jan. 9, 2015

(65) Prior Publication Data
US 2016/0202350 A1 Jul. 14, 2016

(51) Int. Cl.
*H04W 52/54* (2009.01)
*G01S 11/06* (2006.01)
(Continued)

(52) U.S. Cl.
CPC .............. *G01S 11/06* (2013.01); *H04B 17/27* (2015.01); *H04L 27/26* (2013.01);
(Continued)

(58) Field of Classification Search
CPC .. Y02B 60/50; H04W 52/0206; H04W 74/06; H04W 84/12; H04W 84/18; H04W 28/18;
(Continued)

(56) References Cited

U.S. PATENT DOCUMENTS 5,794,129 A * 8/1998 Komatsu ............. H04W 52/325
455/127.2
2007/0097946 A1 5/2007 Mujtaba
(Continued)

FOREIGN PATENT DOCUMENTS

| EP | 2442478 A1 | 4/2012 |
|----|------------|--------|
| WO | 2004014096 A1 | 2/2004 |
| WO | 2013022468 A1 | 2/2013 |

OTHER PUBLICATIONS

International Search Report and Written Opinion—PCT/US2016/012337—ISA/EPO—Apr. 12, 2016.

*Primary Examiner* — Awwet Haile
(74) *Attorney, Agent, or Firm* — Thien T. Nguyen (57) ABSTRACT

Provided are apparatus and methods for ranging between a plurality of wireless devices. An exemplary method includes, at a first wireless device, transmitting a primary portion symbol comprising a first packet and transmitting a secondary portion symbol. The secondary portion symbol is transmitted simultaneously at a lower transmit power than the primary portion symbol, and the secondary portion symbol comprises a second packet identical to the first packet. The primary portion symbol can be transmitted in a first channel having a substantially 20 MHZ bandwidth and the secondary portion can be transmitted in a second channel having a substantially 20 MHZ bandwidth. The first and second channels are substantially adjacent in frequency. After transmitting the primary portion symbol, for example, a high-throughput long-training-field symbol or a very-high-throughput long-training-field symbol can be repetitively transmitted. This exemplary method enhances time-of-arrival estimation accuracy, minimizes decoding bottlenecking, and maximizes wireless device range.

20 Claims, 7 Drawing Sheets

(51) Int. Cl.
*H04L 27/26* (2006.01)
*H04W 52/32* (2009.01)
*H04B 17/27* (2015.01)
*H04W 52/16* (2009.01)

(52) U.S. Cl.
CPC ......... *H04W 52/325* (2013.01); *H04W 52/54* (2013.01); *H04W 52/16* (2013.01)

(58) Field of Classification Search
CPC ............ H04W 52/327; H04W 52/0245; H04L 12/1877
See application file for complete search history.

(56) References Cited

U.S. PATENT DOCUMENTS

| | | |
|---|---|---|
| 2007/0268869 A1* | 11/2007 | Lundby ................. H04W 52/16 370/332 |
| 2010/0277368 A1 | 11/2010 | Ponnuswamy |
| 2011/0299468 A1 | 12/2011 | Van Nee et al. |
| 2011/0305194 A1* | 12/2011 | Zheng .................. H04B 7/0452 370/328 |
| 2011/0305296 A1 | 12/2011 | Van Nee |
| 2014/0307602 A1* | 10/2014 | Seok ................. H04W 52/0216 370/311 |
| 2015/0295676 A1* | 10/2015 | Kenney ................. H04L 5/0023 370/330 |

\* cited by examiner

TECHNIQUES FOR USE IN WIDEBAND TIME-OF-ARRIVAL ESTIMATION

INTRODUCTION

This disclosure relates generally to electronics, and more specifically, but not exclusively, to methods, apparatuses, and articles of manufacture that determine and/or otherwise make use of an estimated time-of-arrival of wireless signal.

Wireless communication systems are widely deployed to provide various types of communication content, such as voice, data, and the like. Typical wireless communication systems are multiple-access systems capable of supporting communication with multiple users by sharing available system resources (e.g., bandwidth, transmit power, etc.). One class of such multiple-access systems is generally referred to as "WiFi," and includes different members of the Institute of Electrical and Electronics Engineers (IEEE) 802.11 wireless protocol family. Generally, a WiFi communication system can simultaneously support communication between multiple wireless stations (mobile devices). Each mobile device communicates with one or more access points (APs) via transmissions on the downlink and the uplink. The downlink (DL) refers to the communication link from the APs to the mobile stations, and the uplink (UL) refers to the communication link from the mobile stations to the APs.

A wireless communication device (e.g., a mobile device) can use any of a variety of range estimation (i.e., radiolocation) techniques to determine a distance (i.e., a range) between the wireless communication device and a reference wireless communication device having a known location (e.g., an AP). Conventional ranging techniques include (RTT)-based positioning and time of arrival (ToA) positioning. A range estimate can be used for determining an indoor position and peer-to-peer (P2P) ranging, just to name a few examples.

Accordingly, there are long-felt industry needs for methods and apparatus that improve upon conventional methods and apparatus, including the provided improved methods and improved apparatus.

SUMMARY

This summary provides a basic understanding of some aspects of the present teachings. This summary is not exhaustive in detail, and is neither intended to identify all critical features, nor intended to limit the scope of the claims.

Exemplary methods and apparatus for ranging between a plurality of wireless devices are provided. An exemplary method includes transmitting a primary portion symbol comprising a first packet; and transmitting a secondary portion symbol. The secondary portion symbol is transmitted simultaneously at a lower transmit power than the primary portion symbol and the secondary portion symbol comprises a second packet that is a duplicate of the first packet.

In a further example, provided is a non-transitory computer-readable medium, comprising instructions stored thereon that, if executed by a processor, such as a special-purpose processor (e.g., an application-specific integrated circuit (ASIC)), cause the processor to execute at least a part of the aforementioned method.

In another example, provided is an apparatus configured to improve ranging accuracy between wireless devices. The apparatus includes means for transmitting a primary portion symbol comprising a first packet, as well as means for transmitting a secondary portion symbol. The secondary portion symbol is transmitted simultaneously at a lower transmit power than the primary portion symbol and the secondary portion symbol comprises a second packet that is a duplicate of the first packet. At least a part of the means for transmitting the primary portion symbol can be integrated on a semiconductor die.

In another example, provided is an apparatus configured to improve ranging accuracy between wireless devices. The apparatus includes a communication device and a processor coupled to the communication device. The processor is configured to initiate transmission, via the communication device, of a primary portion symbol carrying first packets, as well as configured to initiate transmission, via the communication device, of a secondary portion symbol. The secondary portion symbol is transmitted simultaneously at a lower transmit power than the primary portion symbol and the secondary portion symbol comprises a second packet that is a duplicate of the first packet. At least a portion of the processor and at least a portion of the communication device can be integrated on a common semiconductor die.

The foregoing broadly outlines some of the features and technical advantages of the present teachings in order that the detailed description and drawings can be better understood. Additional features and advantages are also described in the detailed description. The conception and disclosed examples can be readily utilized as a basis for modifying or designing other structures for carrying out the same purposes of the present teachings. Such equivalent constructions do not depart from the technology of the teachings as set forth in the claims. The inventive features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to aid in the description of various aspects of the disclosure and are provided solely for illustration of the aspects and not limitation thereof.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all compo-

DETAILED DESCRIPTION

At least one of the exemplary apparatuses and/or exemplary methods disclosed herein advantageously address the long-felt industry needs, as well as other previously unidentified needs, and mitigate shortcomings of the conventional methods and the conventional apparatus. For example, an advantage provided by at least one example of the apparatuses and/or at least one example of the methods disclosed herein is an improvement in wideband ranging accuracy over conventional devices. Another advantage provided by at least one example of the apparatuses and/or at least one example of the methods disclosed herein is that there is a minimal impact on maximum communication range. Further, an advantage provided by at least one example of the apparatuses and/or at least one example of the methods disclosed herein is that the example can be implemented with minimal changes to existing wireless hardware.

More specific aspects of the disclosure are provided in the following description and related drawings directed to various examples provided for illustration purposes. Alternate aspects can be devised without departing from the scope of the disclosure. Additionally, well-known aspects of the disclosure may not be described in detail or may be omitted so as not to obscure more relevant details.

Information and signals described herein can be represented using any of a variety of different technologies and techniques. For example, data, instructions, commands, information, signals, bits, symbols, and chips that are referenced herein can be represented by voltages, currents, electromagnetic waves, magnetic fields or particles, optical fields or particles, or any practical combination thereof, depending in part on the particular application, in part on the desired design, in part on the corresponding technology, and the like.

Further, some examples are described in terms of sequences of actions to be performed by, for example, elements of a computing device. The actions described herein can be performed by specific circuits (e.g., an Application Specific Integrated Circuits (ASICs)), by program instructions being executed by one or more processors (e.g., one or more special-purpose processors), or by a combination thereof. Further, for any of the examples described herein, a corresponding form of any such example can be implemented as, for example, "logic configured to" perform the described action.

ABBREVIATIONS

The following list of abbreviations and acronyms is provided to assist in comprehending the current disclosure, and are not provided as limitations.
DL—Downlink.
HT—High Throughput. A Physical Layer Convergence Protocol (PLCP) format that can use two adjacent channels in a WLAN OFDM system. Each of the adjacent channels can have a bandwidth of substantially 20 MHZ. Different data can be transmitted on each of the constituent channels.
HT-LTF—High throughput long training field. Can carry information for a receiver to determine a channel's characteristics.
HT-SIG—High throughput signal field. Includes two parts (HT-SIG1 and HT-SIG2), each of which include 24 bits of information that can be used to interpret an HT packet.
IEEE—Institute of Electrical and Electronics Engineers. A standards body responsible for developing computing and electronics standards. The IEEE developed the 802.11 group of standards for WLANs (wireless local area networks).
L-LTF—Legacy long training field. Can be two OFDM symbols long.
L-STF—Legacy short training field. Can be two OFDM symbols long.
LAN—Local Area Network.
MHz—Megahertz. One million hertz or cycles per second.
OFDM—Orthogonal Frequency Division Multiplexing. A wireless communications technology and modulation technique that divides available spectrum into multiple radio frequency (RF) channels. In OFDM, a single transmitter transmits on many different, independent frequencies, which typically results in a signal with high resistance to interference.
PLCP—Physical Layer Convergence Protocol.
RTT—Round Trip Time.
ToA—Time of Arrival. Can be used as an input when calculating a range determination.
UE—User Equipment.
UL—Uplink.
VHT—Very High Throughput (e.g., IEEE 802.11ac standard-compliant)
WiFi—Short for "Wireless Fidelity." A type of WLAN (wireless local area network). WiFi enables a mobile device user to couple the mobile device to a local area network (LAN) through a wireless connection. WiFi devices can conform to at least one IEEE 802.11 standard.
WLAN—Wireless Local Area Network. Allows a mobile user to connect a wireless device to a local area network (LAN) through a wireless connection.

Figure 1:
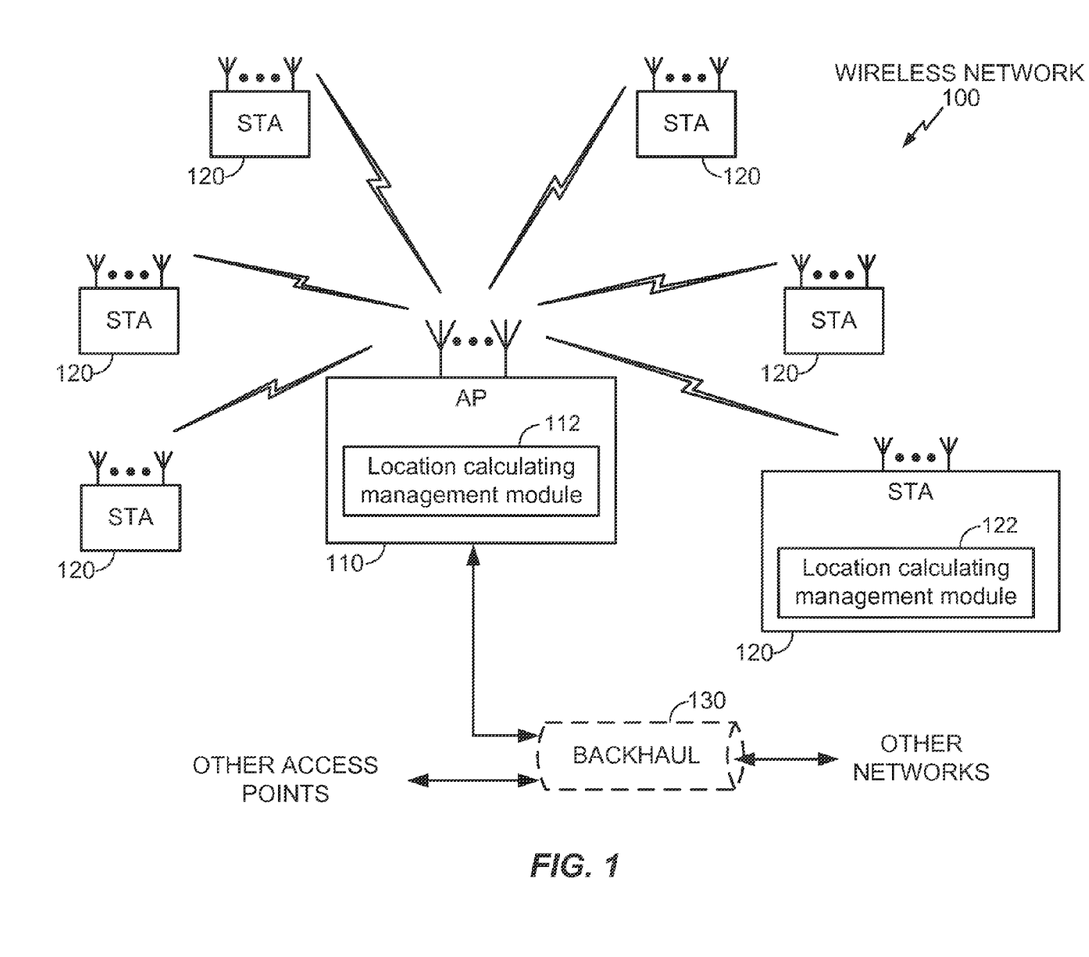
FIG. 1 depicts an exemplary wireless network employing a wireless protocol, in accordance with certain example implementations.

FIG. 1 depicts an exemplary wireless network 100. As shown, the wireless network 100, which can also be referred to herein as a Basic Service Set (BSS), is formed from several wireless nodes including an Access Point (AP) 110 and a plurality of mobile devices (subscriber stations) 120. Each wireless node is generally capable of receiving and/or transmitting. The wireless network 100 can support any number of APs 110 distributed throughout a geographic region to provide coverage for the mobile devices 120. For simplicity, one AP 110 is shown in FIG. 1, providing coordination and control among the mobile devices 120, as well as access to other APs or other networks (e.g., the Internet) via a backhaul connection 130.

The AP 110 is generally a fixed entity that provides backhaul services to the mobile devices 120 in the AP 110's geographic region of coverage. However, the AP 110 can be mobile in some applications (e.g., a mobile device serving as a wireless hotspot for other devices). The mobile devices 120 can be fixed or mobile. Examples of mobile devices 120 include a telephone (e.g., cellular telephone), a laptop computer, a desktop computer, a personal digital assistant, a digital audio player (e.g., MP3 player), a camera, a game console, a display device, a television, a tablet, a set-top box, a digital video disk (DVD) player, a WiFi-compatible device, and/or any other suitable wireless node. The wireless network 100 can be referred to as a wireless local area network (WLAN), and can employ a variety of widely used networking protocols to interconnect nearby devices. In general, these networking protocols can be referred to as "WiFi," including any member of the Institute of Electrical and Electronics Engineers (IEEE) 802.11 wireless protocol family.

As will be described in more detail below, these different entities can be variously configured in accordance with the teachings herein to provide or otherwise support the wideband time-of-arrival estimation discussed briefly above. For example, the AP 110 can include a location calculating management module 112 and corresponding functionality for determining a respective location of one or more of the mobile devices 120, while one or more of the mobile devices 120 can include a location calculating management module 122 and corresponding functionality for determining a respective location of the one or more of the mobile devices 120.

The location calculating management module 112 and the location calculating management module 122 can be configured to determine a communication transit time between the respective mobile device 120 and the AP 110. In an example, the respective mobile device 120 can transmit one or more messages to the AP 110 and can receive a corresponding response message from the AP 110. The location calculating management module 112 and the location calculating management module 122 can record a time instant at which the messages were transmitted and received. The location calculating management module 112 and the location calculating management module 122 can then calculate the communication transit time between the mobile device 120 and the AP 110. Other suitable techniques can be employed to determine the communication transit time between the mobile device 120 and the AP 110. The location calculating management module 112 and the location calculating management module 122 can determine a range estimate, two-dimensional coordinates, three-dimensional coordinates, latitudes and longitudes, Cartesian coordinates, spherical coordinates, geodesic coordinates, and/or other suitable location indicators associated with the respective mobile device 120 and the AP 110.

Accuracy of a range estimate is important, and improves when using a higher bandwidth transmission. A higher bandwidth transmission improves an ability to resolve close-by taps. Hence, higher bandwidth wireless (e.g., WiFi) packets (e.g., 40 MHz, 80 MHz, 160 MHz, and the like) yield better accuracy. However, in a wireless system, transmitting higher bandwidth wireless packets can reduce a maximum distance between which two wireless devices can communicate and can successfully estimate the range between the two wireless devices. The reduction in range is caused by a bottleneck in a wireless receivers' ability to decode the higher-bandwidth packets. Table One provides exemplary estimates of current ranges for different wireless packet bandwidths using typical parameters.

TABLE ONE

| | Bandwidth | | | |
|---|---|---|---|---|
| | 20 MHZ | 40 MHZ | 80 MHZ | 160 MHZ |
| Range | 136.1 m | 120.1 m | 98.5 m | 80.9 m |

Figure 2:
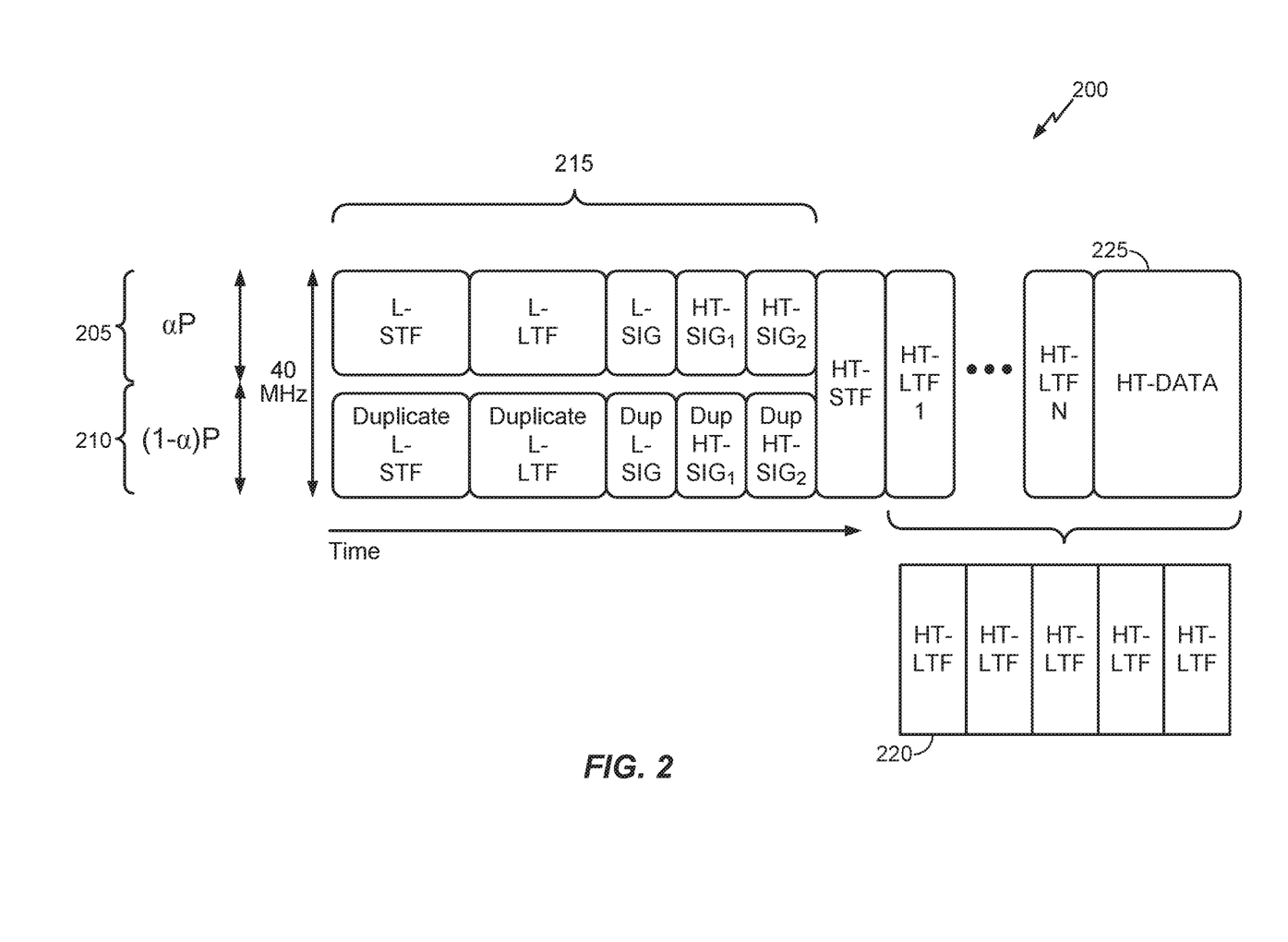
FIG. 2 depicts an exemplary mapping of data across two adjacent 20 MHZ channels over time, in accordance with certain example implementations.

FIG. 2 depicts a mapping 200 of data across two substantially frequency-adjacent channels over time. Each of the channels can have a bandwidth of substantially 20 MHZ. Each of these channels may alternately be referred to herein as a "20 MHZ channel." Referring to FIG. 2, in an example, a wireless high throughput (HT) packet format (which could alternatively be a wireless very high throughput (VHT) packet format) has a primary 20 MHz channel 205 and a secondary 20 MHz channel 210, each of which are one of the two substantially frequency-adjacent 20 MHZ channels. For legacy standards compatibility, the initial part 215 of the packet can be repeated substantially simultaneously in both the primary 20 MHz channel 205 and the secondary 20 MHz channel 210. The initial part 215 of the packet can include at least one of L-STF information, L-LTF information, L-SIG information, HT-SIG information, or a combination thereof. It is possible to take advantage of this packet format to provide improved wideband ranging accuracy with a resultant minimal reduction in maximum range, when compared to a conventional 20 MHz-wide packet.

In an example, the following technique improves wideband ranging accuracy with minimal reduction in maximum range. The mobile device 120 and/or the AP 110 transmits a packet in either the HT packet format or the VHT packet format via the primary 20 MHz channel 205 while using a higher fraction ($\alpha$) of transmit power (P). The mobile device 120 and/or the AP 110 uses the remainder of the transmit power $((1-\alpha)P)$ in the remainder of the combined 40 MHz bandwidth (e.g., to transmit via the secondary 20 MHz channel 210). Thus, a power ratio (i.e., division of power) exists between the primary 20 MHz channel 205 and the secondary 20 MHz channel 210. The power ratio equals $\alpha/(1-\alpha)$.

The power ratio can be fixed or can be adaptively managed. In an example, an adaptive power ratio can be based on a known or estimated transmission distance between the mobile device 120 and the AP 110. For example, as the transmission distance increases, the power ratio is actively controlled to increase. Conversely, as the transmission distance decreases, the power ratio is actively controlled to decrease.

In another example, the power ratio can be adaptively managed based on received power, as measured by the mobile device 120 and/or the AP 110. For example, as the received power increases, the power ratio is actively controlled to decrease. Conversely, as the received power decreases, the power ratio is actively controlled to increase. Further, control information describing the power ratio between the higher transmit power and the lower transmit power can be transmitted between the mobile device 120 and/or the AP 110.

Using the higher fraction of transmit power (i.e., using a higher transmit power ratio) in the primary 20 MHz channel 205 improves ToA calculation accuracy by taking advantage of the benefits of using a 20 MHz channel bandwidth. These benefits can include mitigating decoding bottlenecks and improving a maximum wireless communication range.

Another technique to improve ToA calculation accuracy repeats a HT-LTF symbol 220 or an VHT-LTF symbol in DATA symbols 225 in the primary 20 MHz channel 205. Repeating the HT-LTF symbol 220 or the VHT-LTF symbol in the DATA symbols 225 in the primary 20 MHz channel 205 can also compensate the effects of using a lower transmit power (e.g., a high power ratio) in the secondary 20 MHz channel 210. The mobile device 120 and/or the AP 110 can perform this technique. The number of repetitions can be based on (1) the power ratio between the higher transmit power and the lower transmit power, (2) a total power (e.g., a sum of the higher transmit power and the lower transmit power), or (3) a combination of (1) and (2). Optionally, control information describing a repetition factor of the repeated symbols and/or the power ratio can be transmitted between the mobile device 120 and/or the AP 110.

In an example, the mobile device 120 and/or the AP 110 can transmit a symbol via the primary 20 MHz channel 205 using 80% of the transmit power (i.e., $\alpha$=0.8). Under these conditions, any reduction in the maximum range has a minimal impact (e.g., ~1 dB loss, compared to a 9 dB loss when using a channel having a 160 MHz bandwidth). Using lower transmit power in the remainder of the bandwidth is compensated for by repeating the HT-LTF symbol 220. In this example, when $\alpha$=0.8, no more than five repetitions is required to yield a same or better ToA accuracy. This power format can be used throughout transmitting the packet to ensure minimal impact on carrier sensing, when compared with conventional techniques.

Figure 3A:
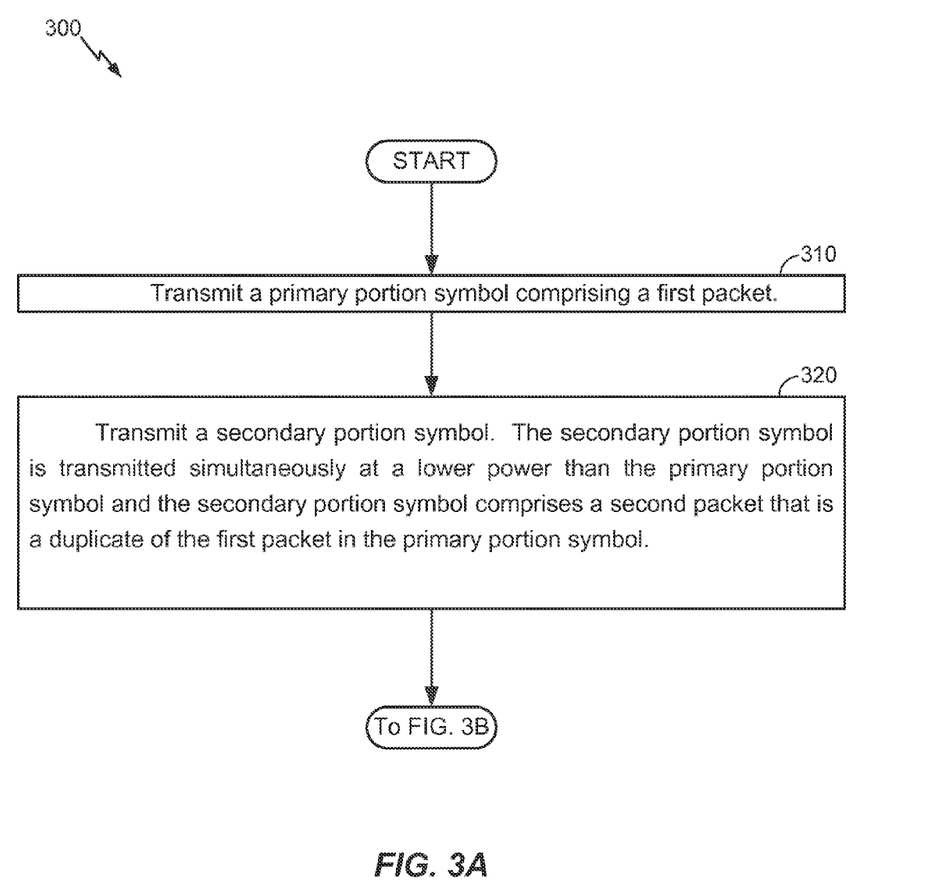
FIGS. 3A-3B depict an exemplary flow diagram depicting an example method of improving ranging accuracy between wireless devices, in accordance with certain example implementations.
Figure 3B:
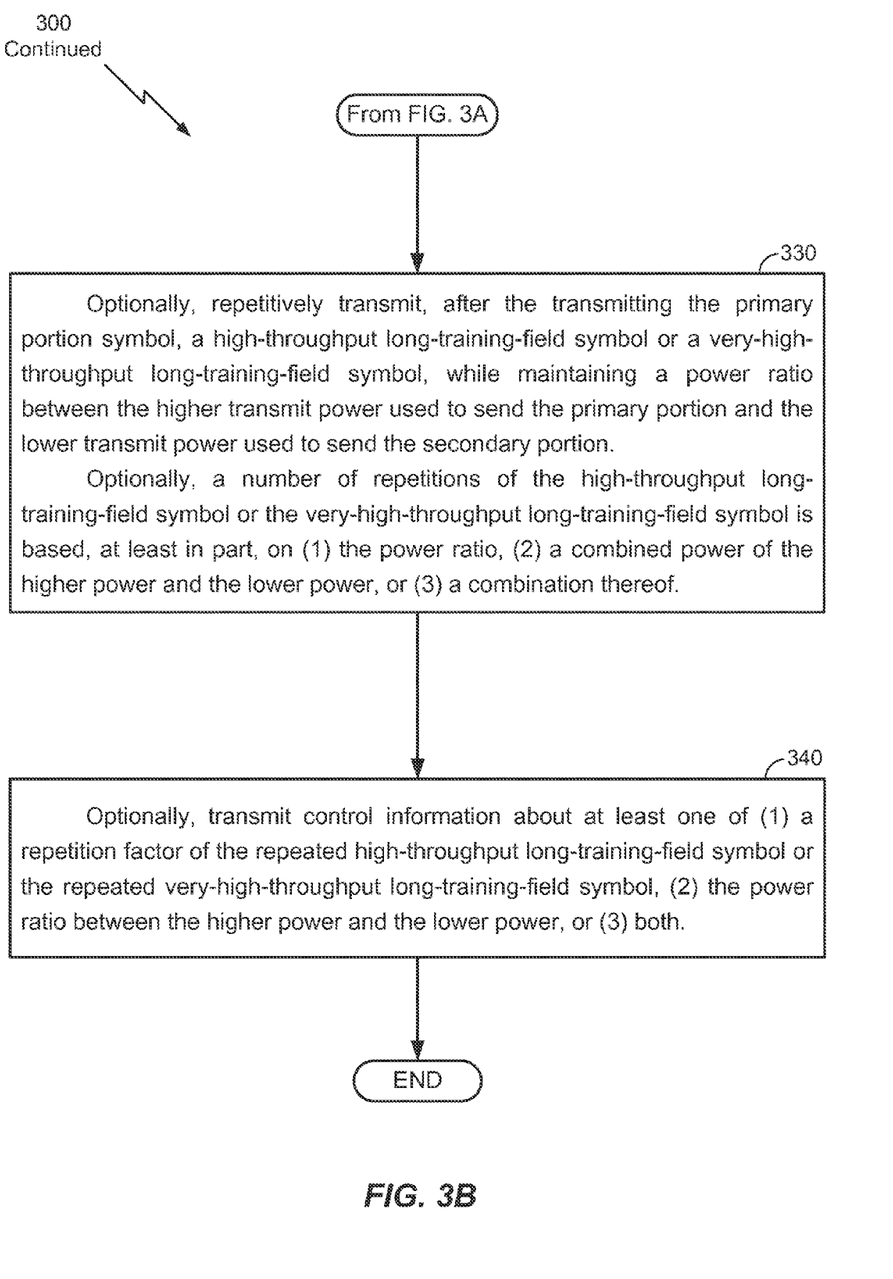

FIGS. 3A-3B depict a flow diagram depicting an exemplary method along with some example optional actions that may be used for possibly improving ranging accuracy between wireless devices. The method 300 can be performed, for example, by a base station (e.g., the AP 110 illustrated in FIG. 1) and/or by a user device (e.g., at least one of the mobile devices 120 illustrated in FIG. 1).

In block 310, a wireless device transmits a primary portion symbol comprising a first packet.

In block 320, the wireless device transmits a secondary portion symbol. The secondary portion symbol is transmitted simultaneously with, and at a lower transmit power than, the primary portion symbol. The secondary portion symbol carries a second packet that is a temporal duplicate of the first packet in the primary portion symbol.

Optionally, (e.g., at block 320) the primary portion symbol can be transmitted in a first channel having a substantially 20 MHZ bandwidth, and the secondary portion can be transmitted in a second channel having a substantially 20 MHZ bandwidth. The second channel is substantially adjacent in frequency to the first channel.

Optionally, (e.g., at block 320) a power ratio between the higher transmit power and the lower transmit power can be fixed or adaptive. The adaptive power split can be based at least in part on an estimated transmission distance to a second wireless device in the plurality of wireless devices, a known transmission distance to the second wireless device, a measured power of a signal received from the second wireless device, or some combination thereof.

In optional block 330, after transmitting the primary portion symbol, the first wireless device can repetitively transmit a high-throughput long-training-field symbol or a very-high-throughput long-training-field symbol. The high-throughput long-training-field symbol or the very-high-throughput long-training-field symbol can be transmitted while maintaining the power ratio between the higher transmit power used to send the primary portion and the lower transmit power used to send the secondary portion.

The number of repetitions of the high-throughput long-training-field symbol or the very-high-throughput long-training-field symbol can be based, at least in part, on the value of the power ratio between the higher transmit power and the lower transmit power; a combined power of the higher transmit power and the lower transmit power; or a combination thereof. For example, if the power ratio is higher (e.g., higher than a first threshold value), the number of repetitions can be relatively lower. If the power ratio is lower (e.g., lower than the first threshold value and/or a second threshold value), the number of repetitions can be relatively higher. In another example, when the number of repetitions is based on the combined power of the higher transmit power and the lower transmit power, if the combined power of the higher transmit power and the lower transmit power is higher (e.g., higher than a first threshold value), the number of repetitions can be relatively lower. Further, if the combined power of the higher transmit power and the lower transmit power is lower (e.g., lower than the first threshold value and/or a second threshold value), the number of repetitions can be relatively higher.

In optional block 340, the first wireless device transmits control information. The control information can indicate a repetition factor of the repeated high-throughput long-training-field symbol or the repeated very-high-throughput long-training-field symbol, the power ratio between the higher transmit power and the lower transmit power, or both.

Figure 4:
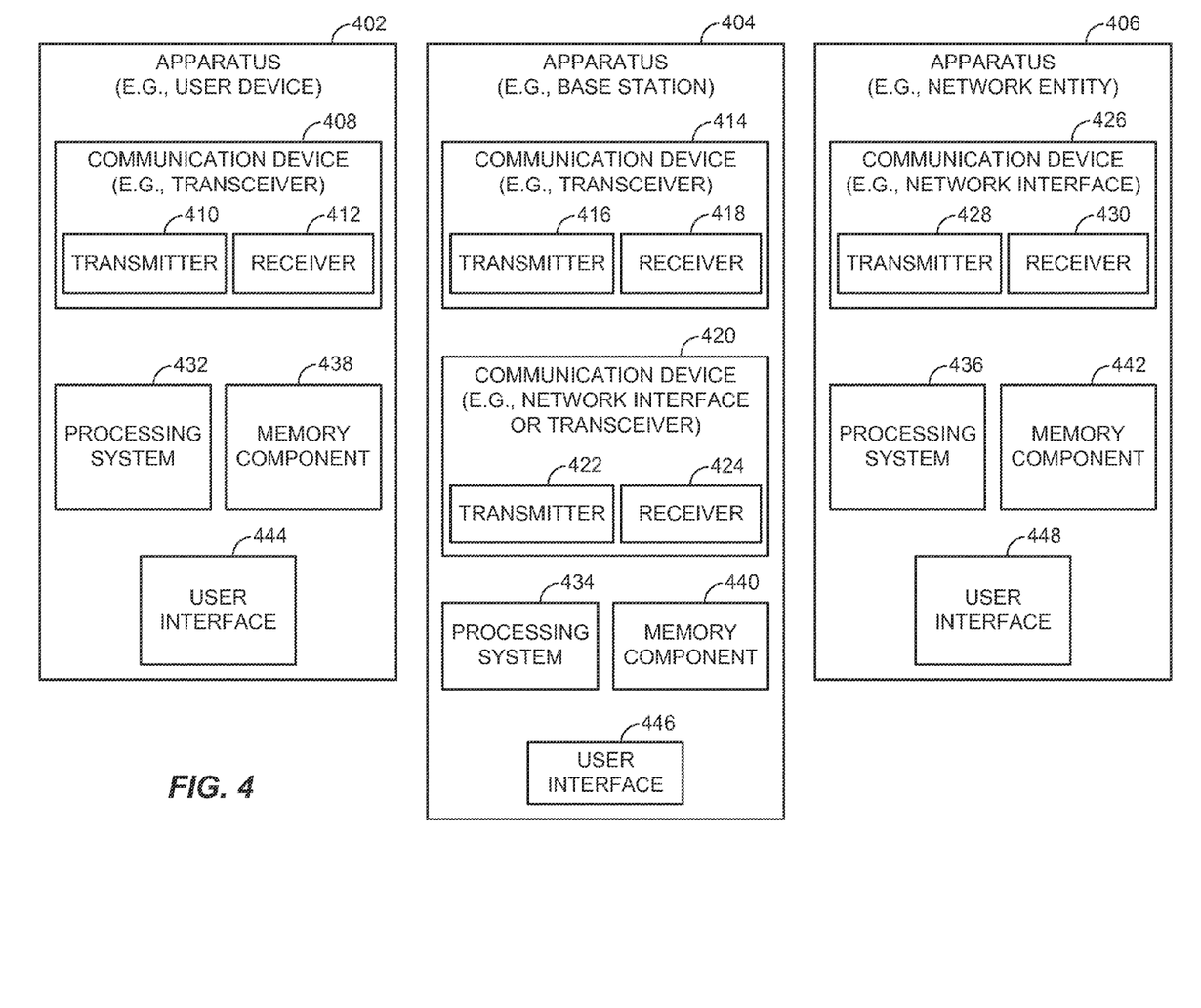
FIG. 4 depicts an exemplary simplified block diagram of exemplary components that can be employed to provide or otherwise support various techniques as provided herein, in accordance with certain example implementations.

FIG. 4 depicts several sample components (represented by corresponding blocks) that can be incorporated into an apparatus 402, an apparatus 404, and/or an apparatus 406 (corresponding to, for example, a user device, a base station, and a network entity, respectively) configured to perform the operations as taught herein. These components can be implemented in different types of apparatuses in different implementations (e.g., in an ASIC, in an SoC, etc.). The depicted components can also be incorporated into other apparatuses in a communication system. For example, other apparatuses in a system can include components similar to those described to provide similar functionality. Also, a given apparatus can include one or more of the components. For example, an apparatus can include multiple transceiver components that enable the apparatus to operate on multiple carriers and/or communicate via different technologies.

The apparatus 402 and the apparatus 404 each include at least one wireless communication device (represented by the communication devices 408 and 414 (and the communication device 420 if the apparatus 404 is a relay)) for communicating with other nodes via at least one designated radio access technology. Each communication device 408 includes at least one transmitter (represented by the transmitter 410) configured to transmit and encode signals (e.g., messages, indications, information, and the like) and at least one receiver (represented by the receiver 412) configured to receive and decode signals. Similarly, each communication device 414 includes at least one transmitter (represented by the transmitter 416) configured to transmit signals and at least one receiver (represented by the receiver 418) configured to receiving signals. If the apparatus 404 is a relay station, each communication device 420 can include at least one transmitter (represented by the transmitter 422) configured to transmit signals and at least one receiver (represented by the receiver 424) configured to receive signals.

A transmitter and a receiver can comprise an integrated device (e.g., embodied as a transmitter circuit and a receiver circuit of a single communication device) in some implementations, can comprise a separate transmitter device and a separate receiver device in some implementations, or can be embodied in other ways in other implementations.

The apparatus 406 (and the apparatus 404 if it is not a relay station) includes at least one communication device (represented by the communication device 426 and, optionally, 420) for communicating with other nodes. For example, the communication device 426 can comprise a network interface that is configured to communicate with one or more network entities via a wire-based or wireless backhaul. In some aspects, the communication device 426 can be implemented as a transceiver configured to support wire-based or wireless signal communication. This communication can involve, for example, sending and receiving: messages, parameters, or other types of information. Accordingly, in the example of FIG. 4, the communication device 426 is shown as comprising a transmitter 428 and a receiver 430. Similarly, if the apparatus 404 is not a relay station, the communication device 420 can comprise a network interface that is configured to communicate with one or more network entities via a wire-based or wireless backhaul. As with the communication device 426, the communication device 420 is shown as comprising a transmitter 422 and a receiver 424.

The apparatuses 402, 404, and 406 also include other components that can be used in conjunction with the operations as taught herein. The apparatus 402 includes a processing system 432 for providing functionality relating to, for example, user device operations to support improving ranging accuracy between wireless devices as taught herein and for providing other processing functionality. The apparatus 404 includes a processing system 434 for providing functionality relating to, for example, base station operations to support improving ranging accuracy between wireless devices as taught herein and for providing other processing functionality. The apparatus 406 includes a processing system 436 for providing functionality relating to, for example, network operations to support improving ranging accuracy between wireless devices as taught herein and for providing other processing functionality. The apparatuses 402, 404, and 406 include memory components 438, 440, and 442 (e.g., each including a memory device), respectively, for maintaining information (e.g., information indicative of reserved resources, thresholds, parameters, and so on). In addition, the apparatuses 402, 404, and 406 include user interface devices 444, 446, and 448, respectively, for providing indications (e.g., audible and/or visual indications) to a user and/or for receiving user input (e.g., upon user actuation of a sensing device such a keypad, a touch screen, a microphone, and so on).

For convenience, the apparatuses 402, 404, and/or 406 are shown in FIG. 4 as including various components that can be configured according to the various examples described herein. It will be appreciated, however, that the illustrated blocks can have different functionality in different designs.

The components of FIG. 4 can be implemented in various ways. In some implementations, the components of FIG. 4 can be implemented in one or more circuits such as, for example, one or more processors and/or one or more ASICs (which can include one or more processors). Here, each circuit can use and/or incorporate at least one memory component for storing information or executable code used by the circuit to provide this functionality. For example, some or all of the functionality represented by blocks 408, 432, 438, and 444 can be implemented by processor and memory component(s) of the apparatus 402 (e.g., by execution of appropriate code and/or by appropriate configuration of processor components). Similarly, some or all of the functionality represented by blocks 414, 420, 434, 440, and 446 can be implemented by processor and memory component(s) of the apparatus 404 (e.g., by execution of appropriate code and/or by appropriate configuration of processor components). Also, some or all of the functionality represented by blocks 426, 436, 442, and 448 can be implemented by processor and memory component(s) of the apparatus 406 (e.g., by execution of appropriate code and/or by appropriate configuration of processor components).

Figure 5:
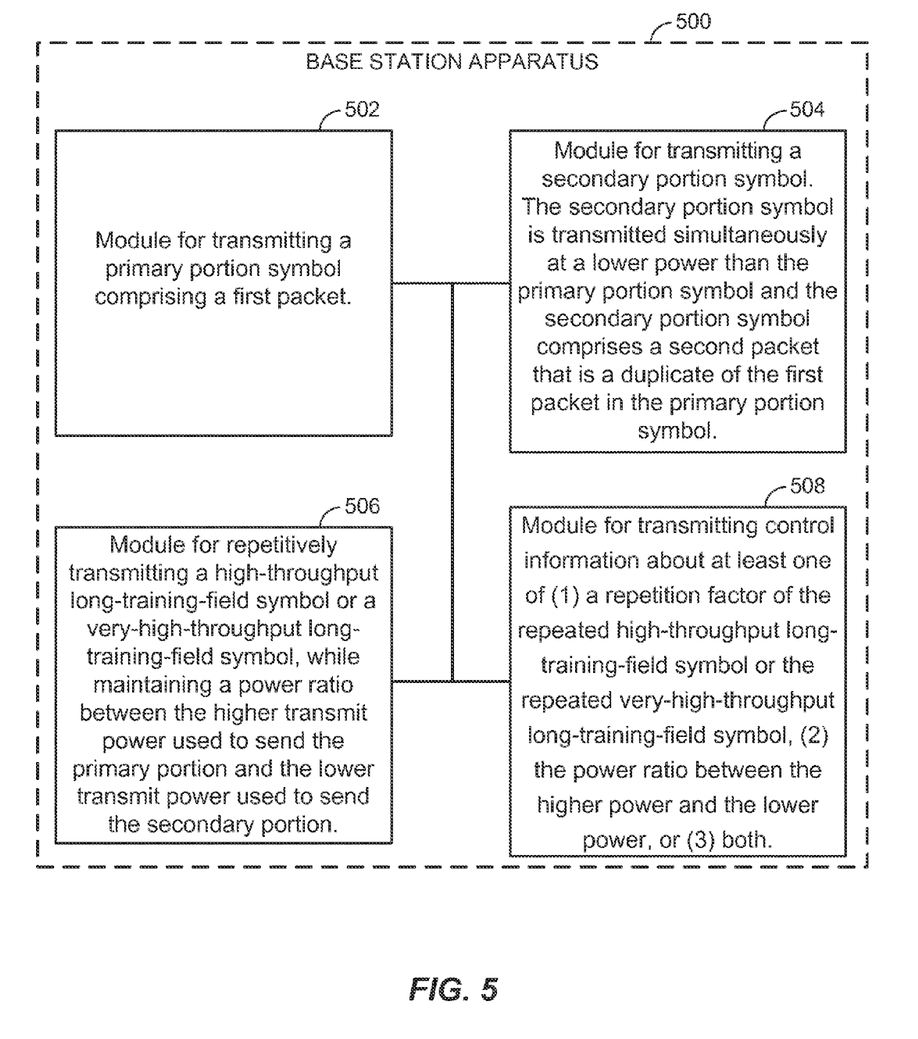
FIGS. 5-6 depict exemplary simplified block diagrams of exemplary apparatuses configured to provide or otherwise support various techniques as provided herein, in accordance with certain example implementations.

FIG. 5 depicts an example base station apparatus 500 represented as a series of interrelated functional modules. A module for transmitting a primary portion symbol carrying a first packet 502 can correspond at least in some aspects to, for example, a communication device as discussed herein. A module for transmitting a secondary portion symbol, where the secondary portion symbol is transmitted simultaneously at a lower transmit power than the primary portion symbol and the secondary portion symbol carries a second packet that is a duplicate of a first packet in the primary portion symbol 504 can correspond at least in some aspects to, for example, a communication device as discussed herein. A module for repetitively transmitting, after the transmitting the primary portion symbol, a high-throughput long-training-field symbol or a very-high-throughput long-training-field symbol while maintaining a power ratio between the higher transmit power used in transmitting the primary portion symbol and the lower transmit power used in transmitting the secondary portion symbol 506 can correspond at least in some aspects to, for example, a communication device as discussed herein. A module for transmitting control information about at least one of (1) a repetition factor of the repeated high-throughput long-training-field symbol or the repeated very-high-throughput long-training-field symbol, (2) the power ratio between the higher transmit power and the lower transmit power, or (3) both 508 can correspond at least in some aspects to, for example, a communication device as discussed herein.

Figure 6:
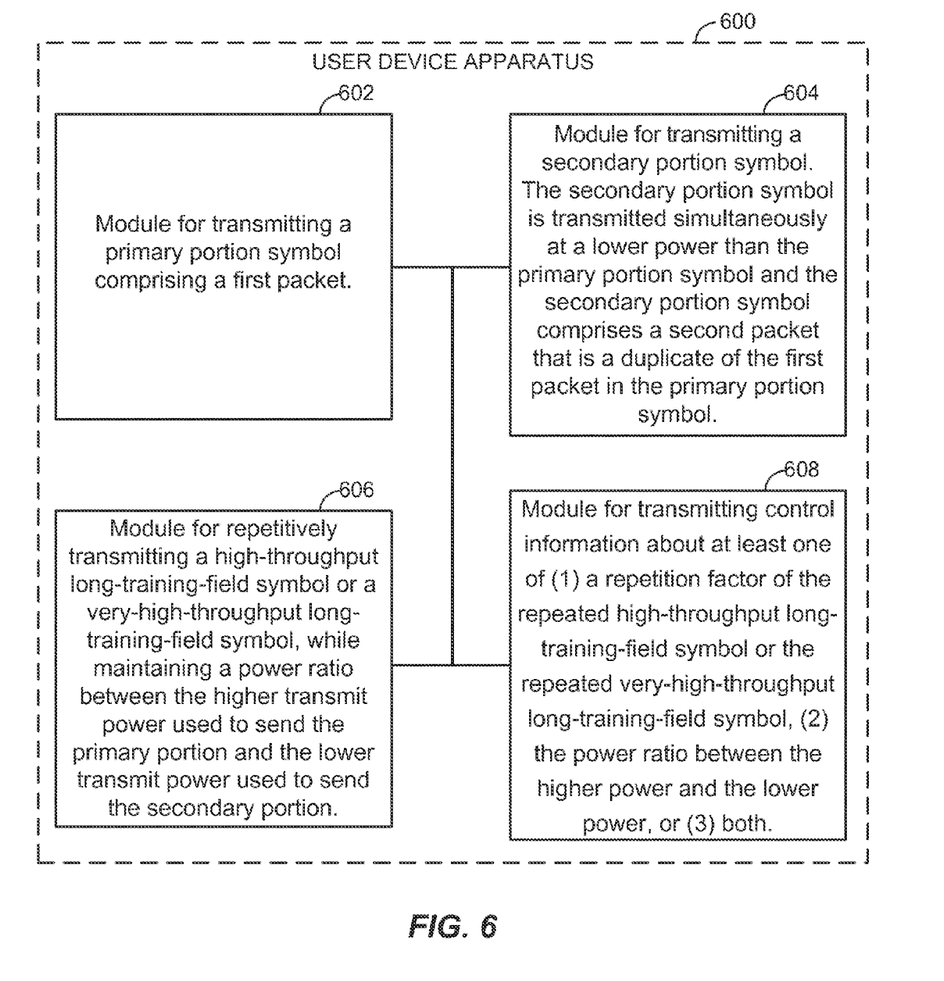

FIG. 6 depicts an example user device apparatus 600 represented as a series of interrelated functional modules. A module for transmitting a primary portion symbol carrying a first packet 602 can correspond at least in some aspects to, for example, a communication device as discussed herein. A module for transmitting a secondary portion symbol, where the secondary portion symbol is transmitted simultaneously at a lower transmit power than the primary portion symbol and the secondary portion symbol carries a second packet that is a duplicate of a first packet in the primary portion symbol 604 can correspond at least in some aspects to, for example, a communication device as discussed herein. A module for repetitively transmitting, after the transmitting the primary portion symbol, a high-throughput long-training-field symbol or a very-high-throughput long-training-field symbol while maintaining a power ratio between the higher transmit power used in transmitting the primary portion symbol and the lower transmit power used in transmitting the secondary portion symbol 606 can correspond at least in some aspects to, for example, a communication device as discussed herein. A module for transmitting control information about at least one of (1) a repetition factor of the repeated high-throughput long-training-field symbol or the repeated very-high-throughput long-training-field symbol, (2) the power ratio between the higher transmit power and the lower transmit power, or (3) both 608 can correspond at least in some aspects to, for example, a communication device as discussed herein.

The functionality of the modules depicted in FIGS. 5-6 can be implemented in ways consistent with the teachings herein. In some designs, the functionality of these modules can be implemented as one or more electrical components. In some designs, the functionality of these blocks can be implemented as a processing system including one or more processor components. In some designs, the functionality of these modules can be implemented using, for example, at least a portion of one or more integrated circuits (e.g., an application-specific integrated circuit (ASIC)). As discussed herein, an integrated circuit can include a processor, software, other related components, or some combination thereof. Thus, the functionality of different modules can be implemented, for example, as different subsets of an integrated circuit, as different subsets of a set of software modules, or a combination thereof. Also, it will be appreciated that a given subset (e.g., of an integrated circuit and/or of a set of software modules) can provide at least a portion of the functionality for more than one module.

In addition, the components and functions represented by FIGS. 5-6, as well as other components and functions described herein, can be implemented using any suitable means. Such means also can be implemented, at least in part, using corresponding structure as taught herein. For example, the components described above in conjunction with the "module for" components of FIGS. 5-6 also can correspond to similarly designated "means for" functionality. Thus, in some aspects, one or more of such means can be implemented using one or more of processor components, integrated circuits, or other suitable structure as taught herein.

As used herein, the term "exemplary" means "serving as an example, instance, or illustration." Any example described as "exemplary" is not necessarily to be construed as preferred or advantageous over other examples. Likewise, the term "examples of the invention" does not require that all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be understood that any reference to an element herein using a designation such as "first," "second," and so forth does not generally limit the quantity or order of those elements. Rather, these designations can be used herein as a convenient method of distinguishing between two or more elements or instances of an element. Thus, a reference to first and second elements does not mean that only two elements can be employed there or that the first element must precede the second element in some manner. Also, unless stated otherwise a set of elements can comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology can include A, or B, or C, or A and B, or A and C, or A and B and C, or 2A, or 2B, or 2C, and so on.

The terminology used herein is for the purpose of describing particular examples only and is not intended to be limiting. As used herein, the singular forms "a," "an," and "the" include the plural forms as well, unless the context clearly indicates otherwise. Further, the terms "comprises," "comprising," "includes," and "including," specify a presence of a feature, an integer, a step, an operation, an element, a component, and the like, but do not necessarily preclude a presence or an addition of another feature, integer, step, operation, element, component, and the like.

In view of the descriptions and explanations above, those of skill in the art will appreciate that the various illustrative logical blocks, modules, circuits, and algorithm steps described in connection with the aspects disclosed herein can be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

An example can include a non-transitory (i.e., a non-transient) machine-readable media and/or a non-transitory (i.e., a non-transient) computer-readable media storing processor-executable instructions which, when executed by a processor (such as a special-purpose processor), transform the processor and any other cooperating devices into a machine (e.g., a special-purpose processor) configured to perform at least a part of a function described herein. In an example, executing the stored instructions can transform a processor and any other cooperating devices into at least a part of an apparatus described herein. A non-transitory (i.e., a non-transient) machine-readable media specifically excludes a transitory propagating signal.

Accordingly, it will be appreciated, for example, that an apparatus or any component of an apparatus can be configured to (or made operable to or adapted to) provide functionality as taught herein. This can be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit can be fabricated to provide the requisite functionality. As another example, an integrated circuit can be fabricated to support the requisite functionality and then configured (e.g., via programming) to provide the requisite functionality. As yet another example, a processor circuit can execute code to provide the requisite functionality.

The provided apparatuses can be a part of, and/or coupled to, an electronic device such as, but not limited to, at least one of a mobile device, a navigation device (e.g., a global positioning system receiver), a wireless device a camera, an audio player, a camcorder, or a game console.

The term "mobile device" can describe, and is not limited to, at least one of a mobile phone, a mobile communication device, a pager, a personal digital assistant, a personal information manager, a personal data assistant, a mobile hand-held computer, a portable computer, a tablet computer, a wireless device, a wireless modem, other types of portable electronic devices typically carried by a person and having communication capabilities (e.g., wireless, cellular, infrared, short-range radio, etc.), a tablet computer, and any other device that is capable of receiving wireless communication signals used in determining a position fix. Further, the terms "user equipment" (UE), "mobile terminal," "user device," "mobile device," and "wireless device" can be interchangeable.

Moreover, the methods, sequences, and/or algorithms described in connection with the aspects disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium can be integral to the processor (e.g., cache memory).

Accordingly, it will also be appreciated, for example, that certain aspects of the disclosure can include a computer-readable medium embodying a method for improving ranging accuracy between wireless devices.

Nothing stated or illustrated depicted in this application is intended to dedicate any component, step, feature, object, benefit, advantage, or equivalent to the public, regardless of whether the component, step, feature, object, benefit, advantage, or the equivalent is recited in the claims While the foregoing disclosure shows various illustrative aspects, it should be noted that various changes and modifications can be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects can be described or claimed in the singular, the plural is contemplated unless limitation to the singular is explicitly stated.

What is claimed is:

1. A method for ranging between a plurality of wireless devices, the method comprising, at a first wireless device in the plurality of wireless devices:
    selecting a first transmission power for transmissions over a first channel and a second transmission power that is lower than the first transmission power for transmissions over a second channel;
    transmitting, over the first channel in accordance with the first transmission power, a primary portion symbol comprising a first packet; and
    transmitting, over the second channel in accordance with the second transmission power, a secondary portion symbol, wherein the secondary portion symbol is transmitted simultaneously with the primary portion symbol and the secondary portion symbol comprises a second packet that is a duplicate of the first packet;
    at the first wireless device repetitively transmitting a high-throughput long-training-field symbol or a very-high-throughput long-training-field symbol, while maintaining a power ratio between the first and second transmission powers,
    wherein a number of repetitions of the high-throughput long-training-field symbol or the very-high-throughput long-training-field symbol is based, at least in part, on:
        the power ratio;
        a combined power of the higher transmit power and the lower transmit power; or
        a combination thereof.

2. The method of claim 1, wherein the first and second channels each has a 20 MHZ bandwidth, and
    wherein the second channel is substantially adjacent in frequency to the first channel.

3. The method of claim 1, wherein a power ratio between the first and second transmission powers is:
    fixed; or
    adaptive, based at least in part on:
        an estimated transmission distance to a second wireless device in the plurality of wireless devices;
        a known transmission distance to the second wireless device;
        a measured power of a signal received from the second wireless device; or
        some combination thereof.

4. The method of claim 1, further comprising, at the first wireless device, transmitting control information indicating:
    a repetition factor of the repeated high-throughput long-training-field symbol or the repeated very-high-throughput long-training-field symbol;
    the power ratio; or
    both.

5. An apparatus for use in ranging between wireless devices, the apparatus comprising:
    means for selecting a first transmission power for transmissions over a first channel and a second transmission power that is lower than the first transmission power for transmissions over a second channel;
    means for transmitting, over the first channel in accordance with the first transmission power, a primary portion symbol comprising a first packet;
    means for transmitting, over the second channel in accordance with the second transmission power, a secondary portion symbol, wherein the secondary portion symbol is transmitted simultaneously with the primary portion symbol and the secondary portion symbol comprises a second packet that is a duplicate of the first packet;
    means for repetitively transmitting a high-throughput long-training-field symbol or a very-high-throughput long-training-field symbol, while maintaining a power ratio between the first and second transmission powers,
    wherein a number of repetitions of the high-throughput long-training-field symbol or the very-high-throughput long-training-field symbol is based, at least in part, on:
        the power ratio;
        a combined power of the higher transmit power and the lower transmit power; or
        a combination thereof.

6. The apparatus of claim 5, wherein the first and second channels each has a 20 MHZ bandwidth, and
    wherein the second channel is substantially adjacent in frequency to the first channel.

7. The apparatus of claim 5, wherein a power ratio between the first and second transmission powers is:
    fixed; or
    adaptive, based at least in part on:
        an estimated transmission distance to a second wireless device;
        a known transmission distance to the second wireless device;
        a measured power of a signal received from the second wireless device; or
        some combination thereof.

8. The apparatus of claim 5, further comprising means for transmitting control information indicating:
    a repetition factor of the repeated high-throughput long-training-field symbol or the repeated very-high-throughput long-training-field symbol;
    the power ratio; or
    both.

9. The apparatus of claim 5, wherein at least a part of the means for transmitting the primary portion symbol is integrated on a semiconductor die.

10. The apparatus of claim 5, wherein the apparatus is at least a part of a mobile device.

11. An apparatus configured to improve ranging accuracy between wireless devices, comprising:
    a communication device; and
    a processor coupled to the communication device and configured to:
        select a first transmission power for transmissions over a first channel and a second transmission power that is lower than the first transmission power for transmissions over a second channel;
        initiate transmission, via the communication device over the first channel in accordance with the first transmission power, of a primary portion symbol carrying a first packet;
        initiate transmission, via the communication device over the second channel in accordance with the second transmission power, of a secondary portion symbol, wherein the secondary portion symbol is transmitted simultaneously with the primary portion symbol and the secondary portion symbol comprises a second packet that is a duplicate of the first packet;

wherein the processor is further configured to initiate repetitive transmission, via the communication device, of a high-throughput long-training-field symbol or a very-high-throughput long-training-field symbol, while maintaining a power ratio between the first and second transmission powers, wherein a number of repetitions of the high-throughput long-training-field symbol or the very-high-throughput long-training-field symbol is based on at least one of:

the power ratio;

a combined power of the higher transmit power and the lower transmit power; or a combination thereof.

12. The apparatus of claim 11, wherein the first and second channels each has a 20 MHZ bandwidth, and wherein the second channel is substantially adjacent in frequency to the first channel.

13. The apparatus of claim 11, wherein a power ratio between the first and second transmission powers is:

fixed; or adaptive, based at least in part on:

an estimated transmission distance to a second wireless device;

a known transmission distance to the second wireless device;

a measured power of a signal received from the second wireless device; or some combination thereof.

14. The apparatus of claim 11, wherein the processor is further configured to initiate transmission, via the communication device, of control information indicating:

a repetition factor of the repeated high-throughput long-training-field symbol or the repeated very-high-throughput long-training-field symbol;

the power ratio; or both.

15. The apparatus of claim 11, wherein at least a portion of the processor and at least a portion of the communication device are integrated on a common semiconductor die.

16. The apparatus of claim 11, wherein the apparatus is at least a part of a mobile device.

17. A non-transitory computer-readable medium having processor-executable instructions stored thereon that are executable by a processor to:

select a first transmission power for transmissions over a first channel and a second transmission power that is lower than the first transmission power for transmissions over a second channel;

initiate transmission, over the first channel in accordance with the first transmission power, of a primary portion symbol carrying a first packet;

initiate transmission, over the second channel in accordance with the second transmission power, of a secondary portion symbol, wherein the secondary portion symbol is transmitted simultaneously with the primary portion symbol and the secondary portion symbol comprises a second packet that is a duplicate of the first packet;

wherein the processor-executable instructions are further executable by the processor to, initiate repetitively transmitting a high-throughput long-training-field symbol or a very-high-throughput long-training-field symbol, while maintaining a power ratio between the first and second transmission powers, wherein a number of repetitions of the high-throughput long-training-field symbol or the very-high-throughput long-training-field symbol is based on at least one of:

the power ratio;

a combined power of the higher transmit power and the lower transmit power; or a combination thereof.

18. The non-transitory computer-readable medium of claim 17, wherein the first and second channels each has a 20 MHZ bandwidth, and wherein the second channel is substantially adjacent in frequency to the first channel.

19. The non-transitory computer-readable medium of claim 17, wherein a power ratio between the first and second transmission powers is:

fixed; or adaptive, based at least in part on:

an estimated transmission distance to a second wireless device;

a known transmission distance to the second wireless device;

a measured power of a signal received from the second wireless device; or some combination thereof.

20. The non-transitory computer-readable medium of claim 17, wherein the processor-executable instructions are further executable by the processor to initiate transmission of control information indicating:

a repetition factor of the repeated high-throughput long-training-field symbol or the repeated very-high-throughput long-training-field symbol;

the power ratio; or both.

* * * * *